(12) United States Patent
Quix et al.

(10) Patent No.: US 9,371,071 B2
(45) Date of Patent: Jun. 21, 2016

(54) METHOD FOR REFUELING MOTOR VEHICLES

(71) Applicant: Ford Global Technologies, LLC, Dearborn, MI (US)

(72) Inventors: Hans Guenter Quix, Herzogenrath NRW (DE); David Van Bebber, Aachen (DE); David Mondrzyk, Augsburg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/632,827

(22) Filed: Feb. 26, 2015

(65) Prior Publication Data
US 2015/0266482 A1    Sep. 24, 2015

(30) Foreign Application Priority Data
Mar. 18, 2014 (DE) .................. 10 2014 204 993

(51) Int. Cl.
| | |
|---|---|
| *B60W 40/00* | (2006.01) |
| *G07C 5/08* | (2006.01) |
| *G07C 5/00* | (2006.01) |
| *B60K 15/03* | (2006.01) |

(52) U.S. Cl.
CPC ............ *B60W 40/00* (2013.01); *G07C 5/00* (2013.01); *G07C 5/0816* (2013.01); *B60K 2015/03019* (2013.01); *B60K 2015/03203* (2013.01); *B60W 2560/02* (2013.01); *G07C 5/008* (2013.01); *G07C 5/085* (2013.01)

(58) Field of Classification Search
CPC .............. B60W 40/00; B60K 2015/03019; G07C 5/08
USPC .................................... 701/123, 2, 36
See application file for complete search history.

(56) References Cited

U.S. PATENT DOCUMENTS

| | | | | | |
|---|---|---|---|---|---|
| 6,128,551 | A | * | 10/2000 | Davis ................ | G06Q 20/341 700/236 |
| 2010/0042340 | A1 | * | 2/2010 | Piszko ................ | G01F 9/008 702/55 |
| 2010/0332363 | A1 | * | 12/2010 | Duddle ............... | B67D 7/348 705/34 |
| 2011/0100507 | A1 | * | 5/2011 | Weitzhandler ...... | B60K 15/04 141/94 |
| 2012/0323499 | A1 | * | 12/2012 | Yelin ................. | G06Q 10/10 702/24 |
| 2013/0013431 | A1 | * | 1/2013 | Fansler .............. | G07F 13/025 705/18 |
| 2013/0144519 | A1 | | 6/2013 | Nakano et al. | |

FOREIGN PATENT DOCUMENTS

WO   2009092473 A1   7/2009

* cited by examiner

*Primary Examiner* — Tan Q Nguyen
(74) *Attorney, Agent, or Firm* — Jennifer M. Stec; Brooks Kushman P.C.

(57) ABSTRACT

A computer-implemented method includes determining, via a vehicle computer, that a current fuel-tank fill-level matches a stored fill-level, stored prior to a refueling process. The method also includes calculating an average fuel-consumption when the current fill-level matches the stored fill-level, based on distance traveled since the refueling process and a total amount of fuel received by the vehicle, as indicated by stored fuel-dispensed data received from one or more fuel pumps, since the stored fill-level was stored.

20 Claims, 2 Drawing Sheets

METHOD FOR REFUELING MOTOR VEHICLES

CROSS-REFERENCE TO RELATED APPLICATIONS

This application claims foreign priority benefits under 35 U.S.C. §119(a)-(d) to DE 10 2014 204 993.8, filed Mar. 18, 2014, which is hereby incorporated by reference in its entirety

TECHNICAL FIELD

The illustrative embodiments relate to a method for refueling a motor vehicle in which data may be transmitted between the motor vehicle and a refueling device.

BACKGROUND

Modern motor vehicles usually have measuring and display devices for determining and displaying the average fuel consumption. These devices are frequently based on the measurement of throughflow rates and can be relatively imprecise.

Furthermore, methods for refueling motor vehicles are known in which data is transmitted between the motor vehicle and a refueling device, such as a gasoline pump of a gasoline station.

In one example, before the start of a refueling process, information about the required fuel is transmitted from the motor vehicle to the tank system. In addition, data is transmitted from the tank system to the motor vehicle, which data permits the type of fuel which is fed to the fuel tank of the motor vehicle and the properties thereof to be detected. An engine control device of the motor vehicle can determine combustion parameters on the basis of the detected fuel and its properties and use said combustion parameters to control the injection system.

In another example, before the start of the refueling process, the motor vehicle transmits a desired quantity of fuel to the refueling device which stops the refueling process after the desired quantity of fuel has been output.

SUMMARY

Against this background, the illustrative embodiments relate to a method for refueling a motor vehicle with a liquid operating fluid, which can be carried out safely and easily and permits particularly precise determination of the average operating fluid consumption of the motor vehicle. This determination is maintained even in the case of partial refueling processes, in which a reservoir vessel which is provided to hold the operating fluid is not completely filled. In addition, the illustrative embodiments relate to a motor vehicle which permits the precise determination of the operating fluid consumed over a time period.

It is to be noted that the features which are specified individually in the claims can be combined with one another in any technically appropriate way and indicate further refinements of the invention.

In one illustrative embodiment, a method for refueling a motor vehicle with a liquid operating fluid, for example fuel, in which data is transmitted between the motor vehicle and a refueling device, in particular a gasoline pump of a gasoline station, has at least the following steps:
  connecting the refueling device to the motor vehicle to facilitate fuel dispensing,
  dispensing fuel into a motor vehicle reservoir vessel, provided with a fill-level sensor,
  before refueling, storing a reservoir vessel fill-level, which is sensed by the fill-level sensor and a current motor vehicle odometer reading, and
  after refueling, transmitting, from the refueling device to the motor vehicle, a dispensed fuel quantity and storing transmitted quantity in a motor vehicle computer memory.

The method permits, on the one hand, a reliable and simple refueling process to be carried out, since the driver of the motor vehicle does not need to carry out any unfamiliar additional operating steps when refueling the motor vehicle. On the other hand, the above method enables the motor vehicle to precisely determine the consumption of operating fluid by the motor vehicle, for example by using an on-board computer provided in the motor vehicle.

This consumption corresponds to actual conditions, and therefore can be used to correct a conventional consumption indication in the motor vehicle which may be based, for example, on the detection of throughflow rates. Even partial refueling processes, in which the reservoir vessel which is provided for holding the operating fluid is not completely filled during the refueling process, do not prevent the precise determination of the average consumption. In a partial refueling process, the values relating to the current fill-level of the reservoir vessel are stored before the refueling process, and the odometer reading is stored before the refueling process. The quantity of operating fluid fed to the reservoir vessel during the refueling process is stored in the vehicle and can be used at a later time for the precise calculation of the actual average consumption, as will be explained below in more detail.

The fill-level sensor does not necessarily have to supply any information about the absolute quantities of operating fluid which are present in the reservoir vessel. To carry out the method according to the present invention it is sufficient to sense only the fill-level of the operating fluid in the reservoir vessel, as a result of which the specific shape of the reservoir vessel does not have to be taken into account. All that is necessary is to detect and store a numerical value corresponding to the signal of the fill-level sensor. The absolute quantity of operating fluid which is fed to the motor vehicle or the reservoir vessel during each refueling process is provided by the refueling device itself. The refueling device is calibrated based on legal requirements and is therefore able to sense precise values relating to a dispensed fuel quantity. A conventional fill-level sensor assigned to the reservoir vessel in the motor vehicle may not be as precise.

Fill-level sensing via a fill-level sensor, storage of the various values in the motor vehicle, reception of the data which is transmitted to the motor vehicle by the refueling device and calculations which are necessary to determine the average consumption of operating fluid are expediently controlled by an electronic control device which is provided in the vehicle. Said electronic control device can be embodied as a stand-alone control device or as part of a control device which is already present in the vehicle, for example.

To assist in achieving a precise average fuel consumption determination, before the start of the refueling process, the fill-level of the reservoir vessel (e.g., fuel-tank), which may be sensed by a fill-level sensor, may only be stored in the motor vehicle (e.g., in a vehicle computer memory) if the motor vehicle is in a horizontal position, the operating fluid present in the reservoir vessel does not slosh and no lateral acceleration is present. These conditions can be sensed with sensors which are nowadays already present in a motor vehicle thus requiring no additional sensors. For example, without limitation, the horizontal position of the motor vehicle and any lateral acceleration can be determined, for example, using driving stability sensors. The sloshing of the operating fluid in the reservoir vessel can be determined directly from fill-level sensor signal fluctuations.

Transmission of data between the motor vehicle and the refueling device may take place wirelessly. Since many motor vehicles nowadays are already equipped with a Bluetooth data transmission device, the transmission of data between the motor vehicle and the refueling device may occur, for example, without limitation, using the Bluetooth standard.

A motor vehicle may comprise a reservoir vessel for holding fuel, a fill-level sensor for sensing a reservoir vessel fill-level, an odometer for sensing the distance traveled by the motor vehicle and a data transmission device which is configured to receive data from a refueling device, such as a gasoline pump of a gasoline station, arranged outside the motor vehicle. The motor vehicle may be configured to be physically connected, during a refueling process, to the refueling device in order to receive fuel, wherein the fuel is fed into the reservoir vessel provided with the fill-level sensor. The motor vehicle also may be configured to store, before the start of the refueling process, a reservoir vessel fill-level, sensed by the fill-level sensor, and the current odometer reading, and to receive, after the end of the refueling process, a quantity of fuel dispensed by the refueling device to the motor vehicle. The quantity data may be sent by the refueling device wirelessly to the vehicle, and to the vehicle may store the dispensed fuel quantity in a local memory.

The motor vehicle may include a control device, which is configured to monitor the current fill-level of the fill-level sensor, and, in the event of the current fill-level of the reservoir vessel corresponding to a fill-level which was stored during an earlier refueling process, to calculate the actual average fuel consumption since that refueling process. In this way it is possible to sense the average fuel consumption even in the case of partial refueling. The average fuel consumption does not have to be calculated whenever a refueling process is terminated, but instead can be calculated even after a relatively long time period with a plurality of refueling processes, whenever a sensed fill-level corresponds to a stored fill-level, since the total actual quantity of fuel dispensed since that sensed fill-level is already stored in one or more records in local memory.

The control device may also be configured to calculate average fuel consumption. The control device adds all the quantities of fuel dispensed since an earlier refueling process (where a fill-level corresponding to a current fill-level was sensed), and divides by the distance traveled since the earlier refueling process.

Further features and advantages of the illustrative embodiments emerge from the following description of exemplary embodiments, which are not to be understood as restrictive and which are explained in more detail below with reference to the drawings.

DETAILED DESCRIPTION

Detailed embodiments are disclosed herein, however, it is to be understood that the disclosed embodiments are merely exemplary and the invention may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art.

Figure 1:
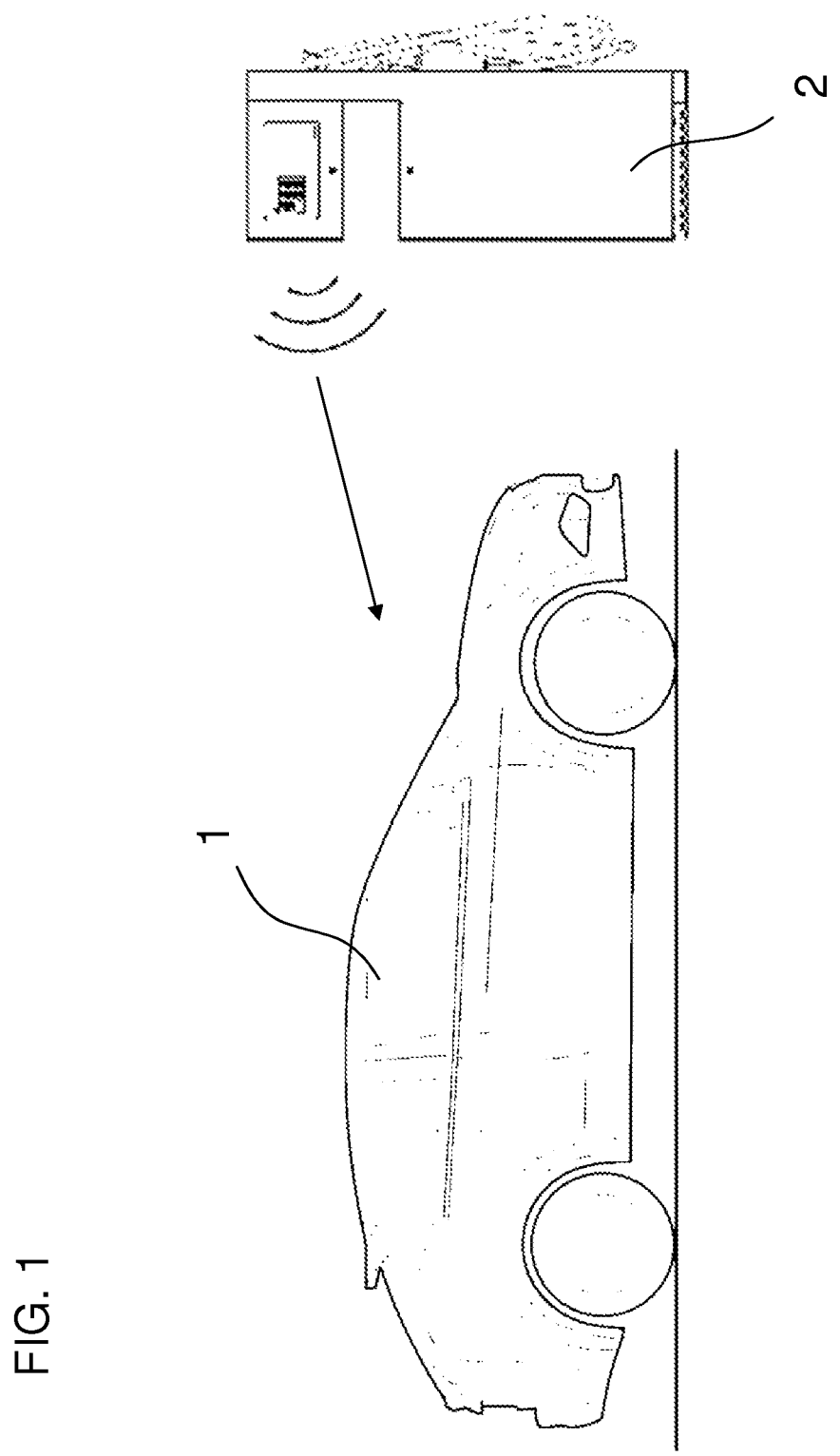
FIG. 1 shows a motor vehicle according to an exemplary embodiment and a refueling device.

FIG. 1 illustrates a motor vehicle 1. The motor vehicle comprises a reservoir vessel for holding fuel, a fill-level sensor for sensing a fill-level in the reservoir vessel, an odometer for sensing the distance traveled by the motor vehicle 1, and a data transmission device which is configured to receive data from a refueling device 2 arranged outside the motor vehicle. FIG. 1 illustrates the state after the termination of the refueling process, in which the quantity of fuel dispensed during the refueling process is transmitted in a wireless fashion, in particular by means of Bluetooth in this example, from the refueling device 2 to the motor vehicle 1 using the data transmission device. The motor vehicle which is illustrated in FIG. 1 also comprises a control device which controls the determination of the fill-level values of the fill-level sensor, an odometer reading determination, storage of all the sensed and determined values, and transmission of data between the refueling device 2 and the motor vehicle 1.

Figure 2:
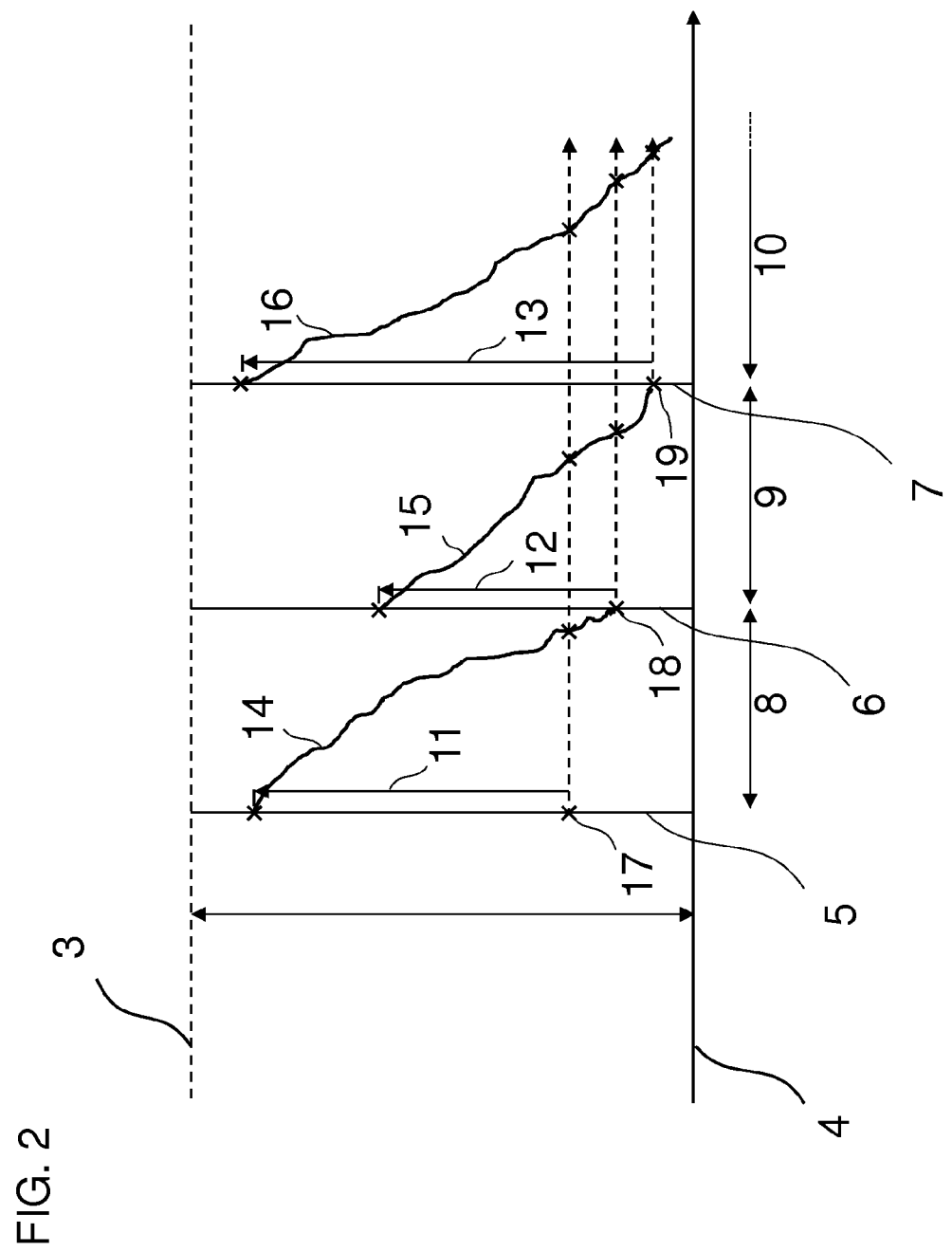
FIG. 2 shows an illustrative process for calculating average fuel consumption.

FIG. 2 illustrates a diagram supporting the method for calculating the average fuel consumption. A horizontal upper line 3 represents a completely full state of the motor vehicle fuel reservoir, and a horizontal lower line 4 represents the emptied state of the reservoir vessel. The line 4 represents a time sequence of three refueling processes 5, 6 and 7 as well as three journeys 8, 9 and 10. In addition, in FIG. 2 the quantities 11, 12 and 13 of operating fluid are fed in during each refueling process and the quantities 14, 15 and 16 of operating fluid represent fuel used during the three journeys 8, 9 and 10.

Before a first refueling process 5, the fill-level sensor of the motor vehicle senses the current fill-level of the fuel present in the reservoir vessel and stores it in the motor vehicle 1 (in a memory, for example). This value can be assigned to a first quantity 17 of operating fluid in the reservoir vessel before the first refueling process 5. The absolute quantity of operating fluid in the reservoir vessel is not known here. Likewise, before the first refueling process 5 a current odometer reading is stored in the motor vehicle 1.

In order to achieve a precise calculation of the average fuel consumption, in the exemplary embodiment of the motor vehicle 1 shown in FIG. 1, the quantity 17 of operating fluid and the current reading of the odometer are stored before the first refueling process 5 in the motor vehicle only if the motor vehicle 1 is in a horizontal position, the fuel is not sloshing in the reservoir vessel and there is no lateral acceleration acting on the motor vehicle (also referred to below herein as recording conditions). The horizontal position and any lateral acceleration are measured using driving stability sensors which are already present in the exemplary embodiment of the motor vehicle 1. The sloshing of fuel in the reservoir vessel is detected by means of signal fluctuations of the fill-level sensor, wherein the smaller the signal fluctuations, the less the operating fluid sloshes in the reservoir vessel.

During the first refueling process 5, a certain fuel quantity 11 is dispensed into the reservoir vessel of the motor vehicle 1. As is apparent in FIG. 2, the reservoir vessel is not completely filled with fuel during the refueling process 5 (partial refueling). After the refueling process 5, the fed-in fuel quantity 11 is transmitted from the refueling device 2 to the motor vehicle 1 in a wireless fashion.

During the first journey 8, the quantity 14 of fuel in the reservoir vessel of the motor vehicle decreases continuously. At a certain time during the journey 8 and before the second refueling process 6, the fill-level sensor records the fill-level 17 again. If the motor vehicle 1 which is illustrated in FIG. 1 is in a horizontal position at this time, there is no lateral acceleration acting on it, and the operating fluid in the reservoir vessel is essentially not sloshing, the actual average fuel consumption can be calculated since both the distance traveled since the preceding refueling process 5 and the actually consumed fuel quantity since the preceding refueling process 5 are known. These were stored in the motor vehicle 1 before the first refueling process 5 and are thus available at the time the fill-level is reached again. The average consumption of operating fluid is calculated in this case from the quantity 11 of fuel which is fed in during the refueling process 5, divided by the distance traveled since then. If the recording conditions (e.g., horizontal vehicle, no lateral acceleration, no sloshing) are not satisfied or if the fuel fill-level 17 is not reached during the first journey 8, because, for example, a further refueling process is carried out before the fill-level 17, the fill-level 17 stored during the first refueling process 5 and the stored reading of the odometer (stored during that process 5) can also be evaluated during a later journey.

Before each new refueling process, for example 6 or 7, the current fill-level 18 or 19 of fuel in the reservoir vessel of the motor vehicle 1 and the current reading of the odometer are, as described above, stored, and after the refueling process 6 or 7 the quantity 12 or 13 of dispensed fuel is transmitted in a wireless fashion to the motor vehicle 1 and also stored in the motor vehicle 1. If this previously stored quantity (fill-level) 17, 18 or 19 is reached again sometime in the course of a later journey of the motor vehicle 1, or even if the motor vehicle 1 is stationary, the average fuel consumption can be calculated precisely, because the quantities dispensed fuel since the storage of the respective fuel fill-levels are precisely known and the distance traveled since the storage of the corresponding fuel-fill level is precisely known. In order to calculate the average fuel consumption, all that is necessary is to add the quantities of fuel dispensed since the last storage of the detected fill-level (i.e., the present fill-level corresponding to a previously recorded fill-level) and to divide it by the distance traveled since the storage of the fill-level to which the detected fill-level corresponds.

The method and the motor vehicle have been explained in more detail on the basis of an exemplary embodiment illustrated in the figures. However, the method and the motor vehicle are not limited to the embodiment described therein but rather also comprise other similarly acting embodiments. For example, the fuel can also be liquid operating fluids other than exclusively fuels, for example a reducing agent for an exhaust gas post-treatment system insofar as the average consumption thereof is of interest to a driver of the motor vehicle with respect to a distance traveled.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:
    determining, via a vehicle computer, that a current fuel-tank fill-level matches a stored fill-level, stored prior to a refueling process; and
    calculating an average fuel-consumption when the current fill-level matches the stored fill-level, based on distance traveled since the refueling process and a total amount of fuel received by the vehicle, as indicated by stored fuel-dispensed data received from one or more fuel pumps, since the stored fill-level was stored.

2. The method of claim 1, wherein fuel-dispensed data is received by the vehicle wirelessly from a fuel pump during the refueling process.

3. The method of claim 2, wherein the total amount of fuel received by the vehicle includes an aggregate amount of fuel represented by fuel-dispensed data received over a plurality of refueling processes since the stored fill-level was stored.

4. The method of claim 1, further comprising:
    storing, before the start of the refueling process, a fuel-tank fill-level only if the motor vehicle is in a horizontal position.

5. The method of claim 1, further comprising:
    storing, before the start of the refueling process, a fuel-tank fill-level only if fuel present in the fuel tank is not sloshing.

6. The method of claim 1, further comprising:
    storing, before the start of the refueling process, a fuel-tank fill-level only if there is no lateral vehicle acceleration.

7. The method of claim 1, further comprising:
    calculating the total distance traveled based on a current odometer value compared to an odometer value stored when the stored fill-level was stored.

8. A system comprising:
    a processor configured to:
        determine, via a vehicle computer, that a current fuel-tank fill-level matches a stored fill-level, stored prior to a refueling process; and
        calculate an average fuel-consumption when the current fill-level matches the stored fill-level, based on distance traveled since the refueling process and a total amount of fuel received by the vehicle, as indicated by stored fuel-dispensed data received from one or more fuel pumps, since the stored fill-level was stored.

9. The system of claim 8, wherein fuel-dispensed data is data received by the vehicle wirelessly from a fuel pump during the refueling process.

10. The system of claim 9, wherein the total amount of fuel received by the vehicle includes an aggregate amount of fuel represented by fuel-dispensed data received over a plurality of refueling processes since the stored fill-level was stored.

11. The system of claim 8, wherein the processor is further configured to:
    store, before the start of the refueling process, a fuel-tank fill-level only if the motor vehicle is in a horizontal position.

12. The system of claim 8, wherein the processor is further configured to:
    store, before the start of the refueling process, a fuel-tank fill-level only if fuel present in the fuel tank is not sloshing.

13. The system of claim 8, wherein the processor is further configured to:
    store, before the start of the refueling process, a fuel-tank fill-level only if there is no lateral vehicle acceleration.

14. The system of claim 8, wherein the processor is further configured to:
    calculate the total distance traveled based on a current odometer value compared to an odometer value stored when the stored fill-level was stored.

15. A non-transitory machine-readable storage medium, storing instructions that, when executed by a processor, cause the processor to perform a method comprising:

determining that a current fuel-tank fill-level matches a stored fill-level, stored prior to a refueling process; and calculating an average fuel-consumption when the current fill-level matches the stored fill-level, based on distance traveled since the refueling process and a total amount of fuel received by the vehicle, as indicated by stored fuel-dispensed data received from one or more fuel pumps, since the stored fill-level was stored.

16. The storage medium of claim 15, wherein fuel-dispensed data is received by the vehicle wirelessly from a fuel pump during the refueling process.

17. The storage medium of claim 16, wherein the total amount of fuel received by the vehicle includes an aggregate amount of fuel represented by fuel-dispensed data received over a plurality of refueling processes since the stored fill-level was stored.

18. The storage medium of claim 15, the method further comprising:

storing, before the start of the refueling process, a fuel-tank fill-level only if the motor vehicle is in a horizontal position.

19. The storage medium of claim 15, the method further comprising:

storing, before the start of the refueling process, a fuel-tank fill-level only if fuel present in the fuel tank is not sloshing.

20. The storage medium of claim 15, the method further comprising:

storing, before the start of the refueling process, a fuel-tank fill-level only if there is no lateral vehicle acceleration.

\* \* \* \* \*